No. 718,897. PATENTED JAN. 20, 1903.
E. P. ARSNEAU.
DERRICK.
APPLICATION FILED MAR. 7, 1902.
NO MODEL.
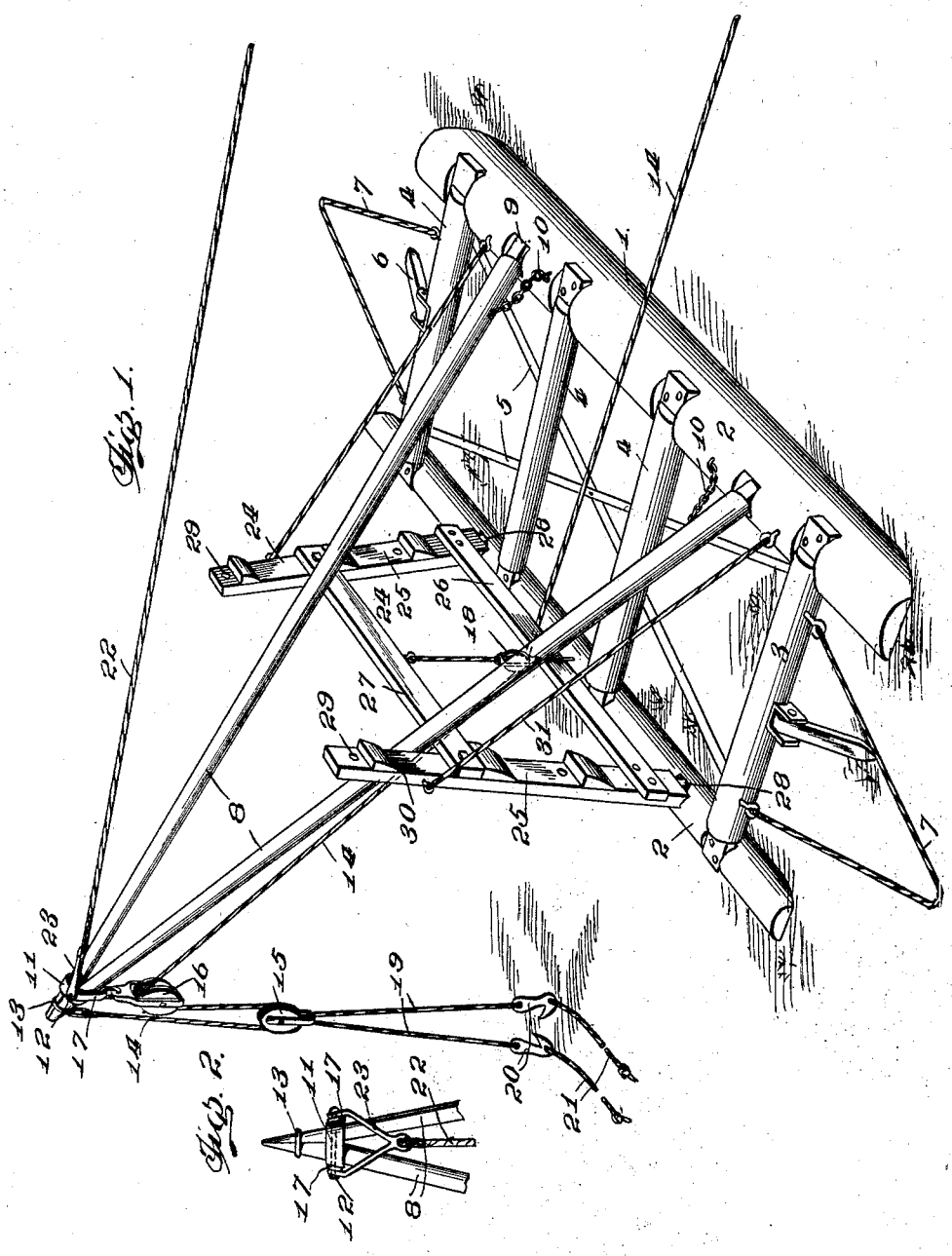

UNITED STATES PATENT OFFICE.

EDWARD P. ARSNEAU, OF DULUTH, MINNESOTA.

DERRICK.

SPECIFICATION forming part of Letters Patent No. 718,897, dated January 20, 1903.

Application filed March 7, 1902. Serial No. 97,159. (No model.)

*To all whom it may concern:*

Be it known that I, EDWARD P. ARSNEAU, a citizen of the United States, residing at Duluth, in the county of St. Louis and State of Minnesota, have invented certain new and useful Improvements in Derricks; and I do hereby declare the following to be a full, clear, and exact description of the invention, such as will enable others skilled in the art to which it appertains to make and use the same.

This invention relates to improvements in derricks, and more particularly to derricks of the portable type which are comparatively light and capable of being moved about from place to place, especially in lumbering-camps and the like.

It consists in a derrick formed with a base or drag, a derrick-frame mounted thereon, and a support or horse on said drag for holding the derrick-frame at various angles with respect to the drag.

It also consists in certain other novel constructions, combinations, and arrangements of parts, as will be hereinafter fully described and claimed.

In the accompanying drawings, Figure 1 is a perspective view of the derrick constructed in accordance with my invention. Fig. 2 is a detail view in elevation of the derrick-frame.

The derrick forming the subject-matter of this invention is constructed with a base-frame or drag 1, formed of side beams or timbers 2 2 and transverse connecting brace beams or timbers 3 and 4. The ends of these transverse beams are preferably let into mortises formed in the upper surface of the side beams or runners 2 and are rigidly secured therein. This frame is further braced by diagonally-arranged brace-rods 5, extending between diagonally opposite corners of the drag. The side beams or runners 2 of the drag are preferably rounded upon their under surfaces at each end, so as to facilitate their being drawn over the surface of the ground. The said frame is adapted to be anchored at different places by pivoted dogs or spuds 6, which have their outer free ends rounded, so as to readily engage the ground or other surface upon which the derrick is resting. These spuds are preferably pivoted to brackets carried by the end cross-timbers 3 of the frame or drag 1. Cables or trace-chains 7 are secured at each end of the drag in any suitable manner, so that a team may be hitched thereto for moving the derrick from place to place. One of the side beams or runners of the drag 1 is preferably made considerably larger and heavier than the other runners of said drag to assist in counterbalancing the weight of the derrick proper, 8, which rests at its lower end upon said large runner. This derrick-frame 8 may be arranged to loosely engage mortises 9, made in the said large runner, or may be hinged thereto and otherwise movably secured to the same. When the derrick 8 is merely loosely mounted upon the said large runner, its lower ends are held against accidental displacement by slack chains, as 10 10.

The derrick-frame consists of two beams converging at their upper ends and being secured together by any suitable encircling means—as, for instance, a ring 11. A bolt 12 is preferably passed through the ring and the holes composing the said derrick, so as to hold the parts in proper position. A ring 13 is also fitted upon the upper tapering end of the derrick 8 for attaching one end of the hoisting-rope 14 thereto. The hoisting-rope passes thence around a block 15 and then through a block 16, suspended from a clevis 17, which clevis is pivoted upon the ends of the bolt 12. The hoisting-rope 14 then passes downwardly and through a block 18, which is suspended in a portion of the frame of the derrick mechanism. The hoisting-rope may then be carried outwardly from the said derrick-frame to any suitable point for hitching it to a team or applying any other power mechanism thereto. The block 15 carries a crotch chain or cable 19, provided with hooks 20 at its lower end for engaging logs or other articles to be raised and moved. These hooks are also provided with ropes or cables 21, by which the log or other article may be directed in its movement. The upper end of the derrick 8 is preferably anchored by means of an anchor guy-rope 22, which is secured to the bolt 12 by means of a clevis 23. The other end of the guy-rope 22 is secured to a tree, stump, or any fixed object for properly bracing the derrick when in use.

The derrick-frame in the present invention is preferably used in a position considerably inclined with respect to the base-frame or drag 1, and it rests upon and is adapted to be supported at different heights by means of a horse 24. The horse 24 consists of uprights 25 and cross brace pieces or bars 26 and 27. While the uprights 25 of the horse may be made parallel throughout, they are preferably slightly converged toward each other at their upper ends. The lower ends of the uprights 25 may be reduced and set loosely in mortises 28, formed in the small runner 2 of the drag, or they may be made to fit snugly in mortises in said runner, or, further, they may be hinged thereto, if desired, all within the spirit of the present invention. The lower brace 26 of the horse is preferably rigidly secured to the uprights 25, while the upper brace 27 is removably bolted or otherwise fastened to the said uprights. The uprights are provided with several apertures, as 29, into which attaching-bolts may be inserted, so that the brace 27 may be adjusted to different points upon the horse and will thereby be made to support the derrick at different inclinations with respect to the base-frame or drag 1. I preferably provide the uprights 25 of the horse with a series of lugs 30, which are arranged immediately below the apertures 29, so that the cross brace or bar 27 will rest upon them in its various adjusted positions. While it is not absolutely essential that these lugs be employed, yet they serve to hold the brace rod or bar 27 in position and reinforce the bolts or pins which engage the apertures 29. Such lugs would be in position to sustain the bulk of the weight imposed upon the cross-bar 27 and relieve the strain upon the means for fastening the said bar of the uprights. Of course it will be apparent that by raising or lowering the cross-bar 27 to different heights upon the uprights 25 the derrick will be supported at different inclinations with respect to the frame or drag 1. The horse 24 is preferably braced in its upright position by means of cables or links 31, which extend from the upper ends of the uprights 25 to the large runner 21 of the drag.

It will be seen that by the arrangement of the parts above described the derrick overhangs one side of the drag, and the runner 2, which is made large and heavy, will counterbalance the overhanging portion of the derrick when the drag is being moved from place to place. The whole structure is simple in form and makes it possible to construct such a derrick of rough timbers, saving greatly in the expense of producing such machinery and preventing the necessity of transporting sleds into the forest regions.

While I have shown and described the derrick as mounted upon a base-frame the side timbers of which are fashioned into runners, still if found more convenient or desirable the base may be set up on other runners of sleds of any suitable construction or on trucks or wheels, such alterations not affecting in the least the spirit of the invention.

Having fully described my invention, what I claim as new, and desire to secure by Letters Patent of the United States, is—

1. A derrick, comprising a base-frame or drag, having two approximately parallel runners, one relatively larger than the other, a derrick-frame mounted on the larger runner and capable of being removed therefrom, and an adjustable support or horse for holding the derrick at various inclinations with respect to the base mounted on the smaller runner, substantially as described.

2. A derrick comprising a base-frame or drag formed of side runners, one of said runners being made large and heavier than the other, a derrick resting upon said large runner and projecting beyond the opposite side of the frame, a support or horse for holding the said derrick at various inclinations with respect to the base-frame or drag, the large runner of said drag counterbalancing the derrick when the same is being moved from place to place, and hoisting-tackle carried by the said derrick, substantially as described.

3. A derrick comprising a frame or drag, a derrick proper mounted upon one side thereof and overhanging the other side, a support upon said other side of the base-frame arranged beneath the derrick, adjustable means upon said support for determining the angle of inclination of the derrick, and hoisting means carried by the derrick, substantially as described.

4. A derrick, comprising a base-frame having two approximately parallel runners, one of relatively greater size than the other, a derrick-frame mounted on said larger runner and capable of being removed therefrom, of a support or horse mounted on a smaller runner and comprising uprights suitably secured to the said runner, and an adjustable bar or base extending from one upright to the other for supporting the derrick proper in its adjusted position, substantially as described.

5. A derrick comprising a base-frame or drag, a derrick proper mounted thereon, an adjustable support or horse beneath said derrick and having a series of apertures extending through the same, a series of lugs or braces beneath said apertures, and an adjustable cross brace or bar adapted to be secured to said aperture so that it may be adjusted at different heights and rest upon the aforesaid lugs, thus supporting the derrick at different inclinations, and hoisting means carried by the said derrick, substantially as described.

6. A derrick comprising a base-frame or drag formed with side runners and cross connecting-bars, dogs or spuds carried thereby for automatically preventing the movement of the drag when in use, a derrick-frame carried by the drag consisting of two poles resting at their lower ends on one of said runners and meeting at their ends, an inclosing means or ring surrounding the upper ends for holding them together, and means for supporting clevises and tackle from the upper end of said derrick, substantially as described.

7. A derrick formed with a drag or supporting base-frame, a derrick-frame mounted thereon composed of poles joined together at their upper ends, their lower separated ends resting upon the said drag, a collar or ring for holding the upper ends of the poles together, a second ring at the upper end for supporting one end of a hoisting-cable, a bolt passing through said ring and the poles on the derrick and projecting beyond the same, clevises carried by the said pole, hoisting-tackle suspended from one clevis, an anchor guy-rope attached to the other clevis, and means carried by the said hoisting-tackle for engaging a log or other tackle to be moved, substantially as described.

8. A derrick comprising a base-frame or drag, a derrick-frame mounted thereon, a supporting-horse formed with uprights, a bar or brace-piece adapted to be secured to the said horse at different heights for correspondingly holding the derrick in different positions, a series of lugs formed on the horse for supporting the said bar in its different positions, and means for bracing the horse with respect to the drag or base-frame, substantially as described.

In testimony whereof I hereunto affix my signature in presence of two witnesses.

EDWARD P. ARSNEAU.

Witnesses:
JAMES F. WATSON,
H. F. LANNIGAN.